(12) United States Patent
Stewart

(10) Patent No.: US 9,447,811 B2
(45) Date of Patent: Sep. 20, 2016

(54) FASTENER AND RETAINER ASSEMBLY

(75) Inventor: Robert E. Stewart, Farmington Hills, MI (US)

(73) Assignee: Nicholas Strumbos, Livonia, MI (US)

( * ) Notice: Subject to any disclaimer, the term of this patent is extended or adjusted under 35 U.S.C. 154(b) by 213 days.

(21) Appl. No.: 13/170,280

(22) Filed: Jun. 28, 2011

(65) Prior Publication Data

US 2013/0004259 A1    Jan. 3, 2013

(51) Int. Cl.
*F16B 39/10* (2006.01)
*F16B 37/06* (2006.01)

(52) U.S. Cl.
CPC ............ *F16B 39/10* (2013.01); *F16B 37/065* (2013.01)

(58) Field of Classification Search
CPC ...... F16B 39/10; F16B 43/00; F16B 41/002; F16B 37/00; F16B 37/065; Y10S 411/984; Y10S 411/992; Y10S 411/973
USPC ......... 411/337, 531, 119, 120, 121, 102, 92, 411/183
See application file for complete search history.

(56) References Cited

U.S. PATENT DOCUMENTS

| | | | | |
|---|---|---|---|---|
| 2,055,130 | A * | 9/1936 | Hotchkin | 174/51 |
| 2,069,402 | A * | 2/1937 | Cowlin | 411/154 |
| 2,274,010 | A * | 2/1942 | Stellin | 411/161 |
| 2,324,175 | A * | 7/1943 | Simms | 411/427 |
| 2,406,079 | A * | 8/1946 | Krueger | 439/878 |
| 2,985,213 | A * | 5/1961 | Consandine | F16B 37/065 411/183 |
| 3,205,758 | A * | 9/1965 | Fischer | 411/520 |
| 3,496,980 | A * | 2/1970 | Kring et al. | 411/112 |
| 4,267,870 | A * | 5/1981 | Warner | 411/98 |
| 4,501,402 | A * | 2/1985 | Saito et al. | 248/346.02 |
| 4,734,001 | A * | 3/1988 | Bennett | 411/119 |
| 4,737,057 | A * | 4/1988 | Olsson | 411/92 |
| 4,906,150 | A * | 3/1990 | Bennett | 411/119 |
| 5,195,860 | A * | 3/1993 | Steyn | 411/526 |
| 5,797,232 | A * | 8/1998 | Larson | 52/408 |
| 5,934,851 | A * | 8/1999 | Stewart et al. | 411/183 |
| 5,971,686 | A * | 10/1999 | Stewart et al. | 411/120 |
| 6,027,293 | A * | 2/2000 | Beemer et al. | 411/119 |
| 6,220,806 | B1 * | 4/2001 | Chapman et al. | 411/526 |
| 6,688,825 | B1 * | 2/2004 | Stewart et al. | 411/174 |
| 6,796,907 | B2 * | 9/2004 | McGuire et al. | 470/23 |
| 6,799,929 | B2 * | 10/2004 | Oates et al. | 411/121 |
| 7,527,464 | B2 * | 5/2009 | Stewart et al. | 411/107 |

OTHER PUBLICATIONS

Braila, James G.. (2007). Handbook of Manufacturing Processes—How Products, Components and Materials are Made—2.D8 Flanging. Industrial Press. Online version available at:http://app.knovel.com/hotlink/pdf/id:kt006HRVN6/handbook-manufacturing/flanging.*

* cited by examiner

*Primary Examiner* — Flemming Saether
(74) *Attorney, Agent, or Firm* — Reising Ethington P.C.

(57) ABSTRACT

A fastener and retainer assembly includes a threaded fastener having a head and a retainer projecting laterally from the head to engage adjacent structure and retain the head against rotation during threading. The retainer includes, and preferably consists essentially of, a one-piece metal stamping having raised embossments and/or a raised edge flange to strengthen the retainer against bending during use. The retainer preferably has a generally planar body from which the embossments and/or the edge flange extends.

18 Claims, 4 Drawing Sheets

FASTENER AND RETAINER ASSEMBLY

The present disclosure is directed to a fastener and retainer assembly that includes a threaded fastener such as a nut or a bolt and a laterally extending retainer for engagement with adjacent structure to retain the fastener against rotation.

BACKGROUND AND SUMMARY OF THE DISCLOSURE

Conventional fastener and retainer assemblies of the subject type include a threaded fastener such as a nut or a bolt. Retainer that is non-rotatably coupled to the fastener head and extends laterally from the fastener to engage adjacent structure to retain the fastener head against rotation as a mating element is threaded onto the fastener. The retainer typically is a stamped element of metal construction, such as steel, having opposed flat faces. A general object of the present disclosure is to provide a fastener and retainer assembly, and to provide a retainer for use in such an assembly, that uses less metal and therefore is less expensive than retainers of the prior art while maintaining adequate strength.

The present disclosure embodies a number of aspects that can be implemented separately from or in combination with each other.

A fastener and retainer assembly, in accordance with one aspect of the present disclosure, includes a threaded fastener having a head and a retainer projecting laterally from the head to engage adjacent structure and retain the head against rotation during threading. The retainer includes, and preferably consists essentially of, a one-piece metal stamping having raised embossments and/or a raised edge flange to strengthen the retainer against bending during use. The retainer preferably has a generally planar body from which the embossments and/or the edge flange extends.

A retainer for use in a fastener and retainer assembly, in accordance with another aspect of the present disclosure, includes a one-piece metal stamping having a hexagonal opening for receipt over the head of a retainer, and raised embossments and/or a raised edge flange to strengthen the retainer during use. The hexagonal head of the fastener, which can be a nut or a bolt for example, preferably is non-removably assembled to the retainer, such as by having one or more corners of the hexagonal head staked against the body of the retainer. The retainer may have linear side edges that extend toward each other away from the hexagonal opening. In preferred but exemplary embodiments, the retainer is either flat or L-shaped as viewed laterally of the fastener opening.

BRIEF DESCRIPTION OF THE DRAWINGS

The disclosure, together with additional objects, features, advantages and aspects thereof, will best be understood from the following description, the appended claims and the accompanying drawings, in which:

DETAILED DESCRIPTION OF PREFERRED EMBODIMENTS

Figure 1:
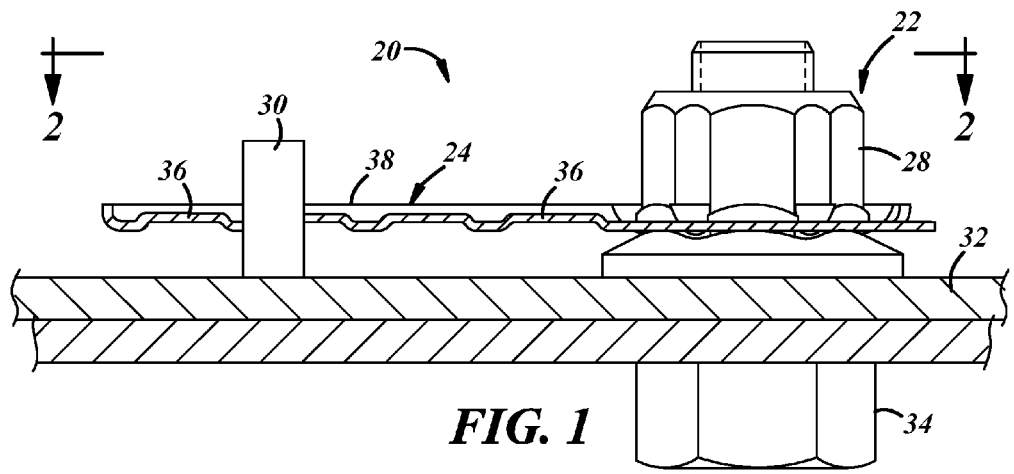
FIG. 1 is an elevational view that illustrates a fastener and retainer assembly in accordance with a first exemplary embodiment of the disclosure.

FIGS. 1-5 illustrate a fastener and retainer assembly 20 in accordance with one exemplary embodiment of the present disclosure as including a threaded fastener 22 and a retainer 24. Retainer 24 preferably has at least one hexagonal opening 26, and fastener 22 preferably has a hexagonal head 28 received in opening 26 so that fastener 22 and retainer 24 are non-rotatable with respect to each other. Fastener 22 can be non-removably secured to retainer 24, such as by staking at one or more corners of head 28. The purpose of retainer 24 is to engage adjacent structure 30, such as a stud on a plate 32, to hold fastener 22 against rotation during threading, such as during threaded engagement by a bolt 34. The stud is merely exemplary of structure that can be engaged by retainer 24.

Figure 2:
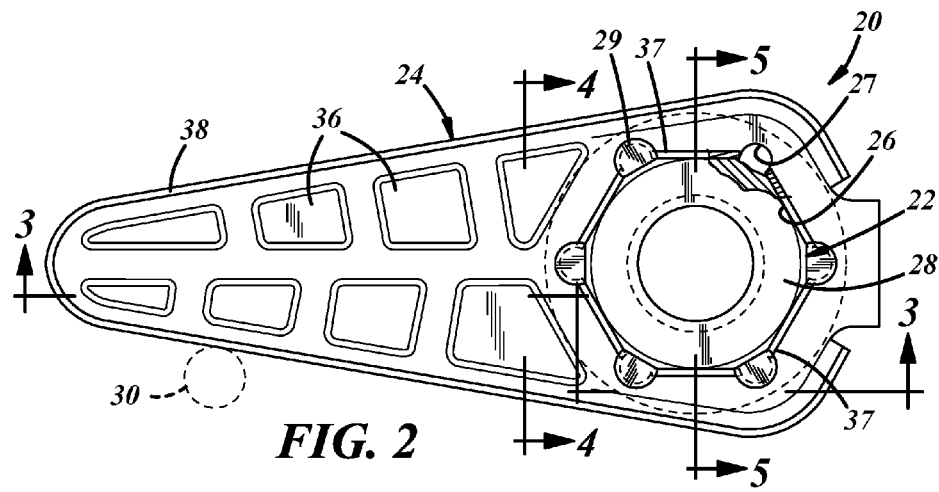
FIG. 2 is a top plan view of the fastener and retainer assembly in FIG. 1, being taken substantially from the direction 2-2 in FIG. 1.
Figure 3:
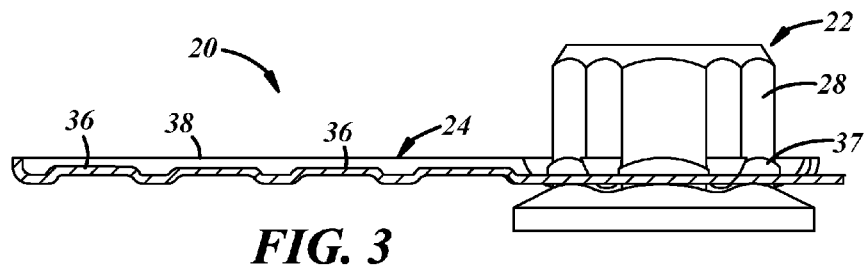
FIGS. 3, 4 and 5 are sectional views taken substantially along the respective lines 3-3, 4-4 and 5-5 in FIG. 2.
Figure 4:
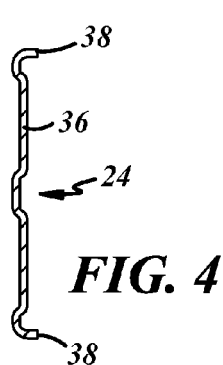
Figure 5:
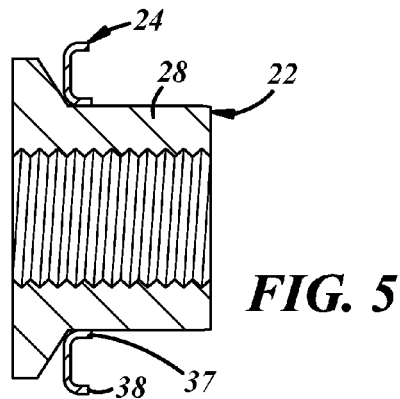

In accordance with the present disclosure, retainer 24 includes, and preferably consists essentially of, a one-piece metal stamping having raised embossments 36 and/or a raised edge flange 38 to strengthen the retainer against bending during abutment with structure 30 and threaded engagement of fastener 22. With reference to FIG. 2, retainer 24 includes rounded reliefs 27 at least partially establishing the opening 26 to accommodate staked corners 29 of the fastener 22. Retainer 24 preferably includes both embossments 36 and flange 38, as illustrated in FIGS. 1-5. Likewise, as is evident from FIGS. 2-4, the retainer 24 includes a plurality of raised flanges 37 that extend generally perpendicularly from the planar body of the retainer 24 when the retainer 24 is assembled to the fastener 22. As is also evident from FIGS. 2-4, the flanges 37 are disposed around and at least partially establish the opening 26 (FIG. 2) for receiving the fastener head 28 and for contacting corresponding sides of the fastener head 28 so that the fastener head 28 and the retainer 24 are non-rotatable with respect to one another. The one-piece metal stamping that forms at least part of retainer 24 preferably is of uniform thickness, as best seen in FIGS. 1 and 3-5 (and FIGS. 7, 9 and 12). Retainer 24 can be formed in a suitable blanking and bending operation from relatively thin metal, such as steel, and embossments 36 and/or flange 38 provides sufficient strength against bending or deformation that the retainer performs as well as conventional retainers of thicker and more expensive steel construction.

It has been found that retainer 24 (or 46 or 56 in other exemplary disclosed embodiments) allows a substantial reduction in material thickness with no loss of product performance and with significant material cost savings. In the exemplary embodiment of FIGS. 1-5, material thickness can be reduced ⅔ as compared with conventional retainers with no loss of product performance.

Figure 6:
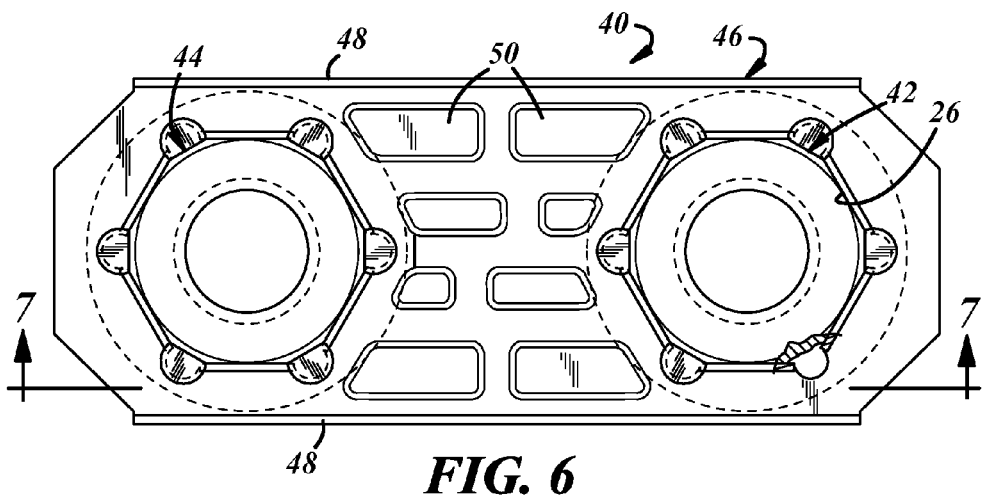
FIG. 6 is a top plan view of a fastener and retainer assembly in accordance with a second exemplary embodiment of the present disclosure.
Figure 7:
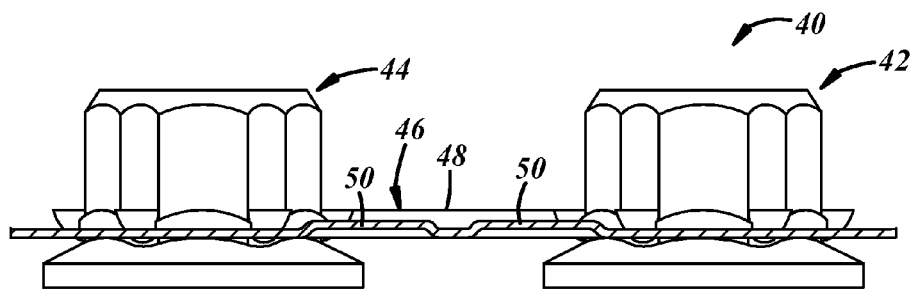
FIG. 7 is a sectional view taken substantially along the line 7-7 in FIG. 6.

FIGS. 6-7 illustrate a fastener and retainer assembly 40 in accordance with a second exemplary embodiment of the disclosure, in which a pair of fasteners 42, 44 are mounted on a retainer 46. Fasteners 42, 44 preferably comprise respective nuts secured to retainer 46 by staking or other suitable means. Retainer 46 includes raised edge flanges 48 and raised embossments 50 for strengthening as previously described.

Figure 8:
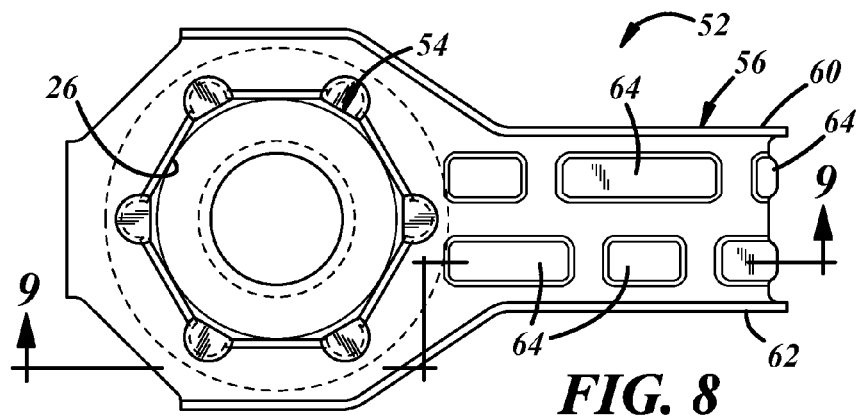
FIG. 8 is a top plan view of a fastener and retainer assembly in accordance with a third exemplary embodiment of the present disclosure.
Figure 9:
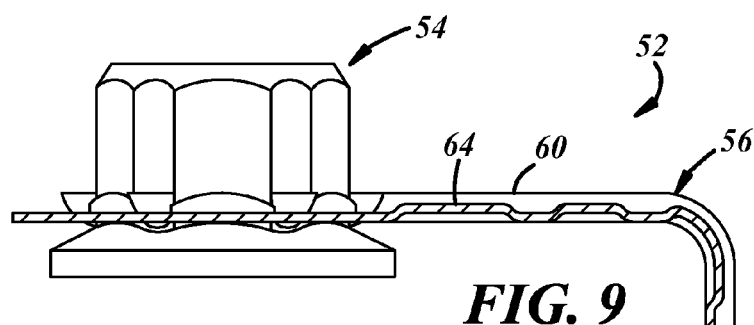
FIG. 9 is a sectional view of the assembly illustrated in FIG. 8, being taken substantially along the line 9-9 in FIG. 8.
Figure 10:
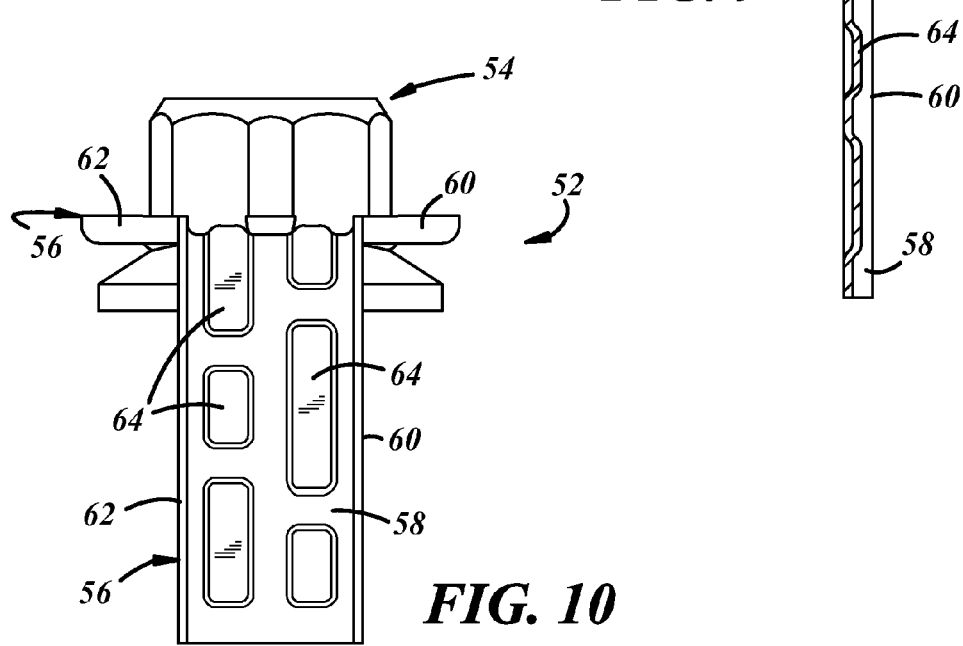
FIG. 10 is an end elevational view of the fastener and retainer assembly illustrated in FIG. 8.

FIGS. 8-10 illustrate a fastener and retainer assembly 52 that includes a fastener 54 and a retainer 56. Retainer 56 is substantially L-shaped as viewed laterally of fastener 54, as best seen in FIG. 9. The end 58 of retainer 56 remote from fastener 54 can engage the periphery of an opening in the adjacent structure to retain fastener 54 against rotation. Again, retainer 56 includes raised edge flanges 60, 62 and raised embossments 64 for strengthening.

Figure 11:
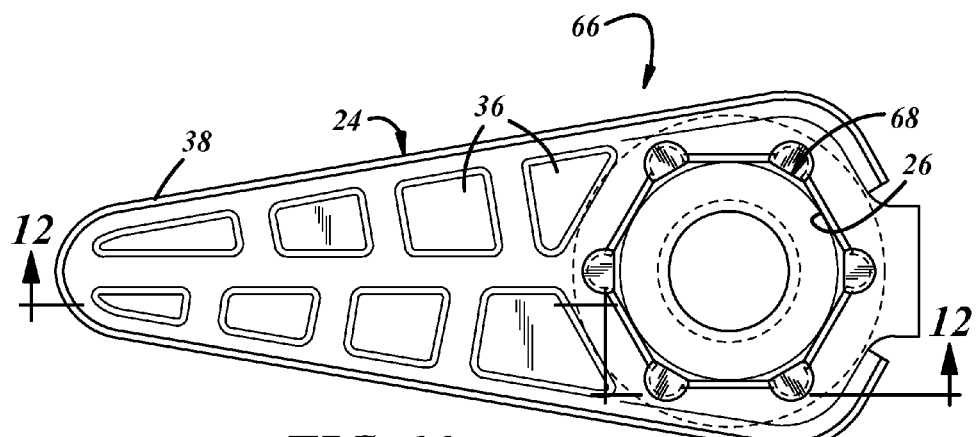
FIG. 11 is a top plan view of a fastener and retainer assembly in accordance with a fourth exemplary embodiment of the present disclosure.
Figure 12:
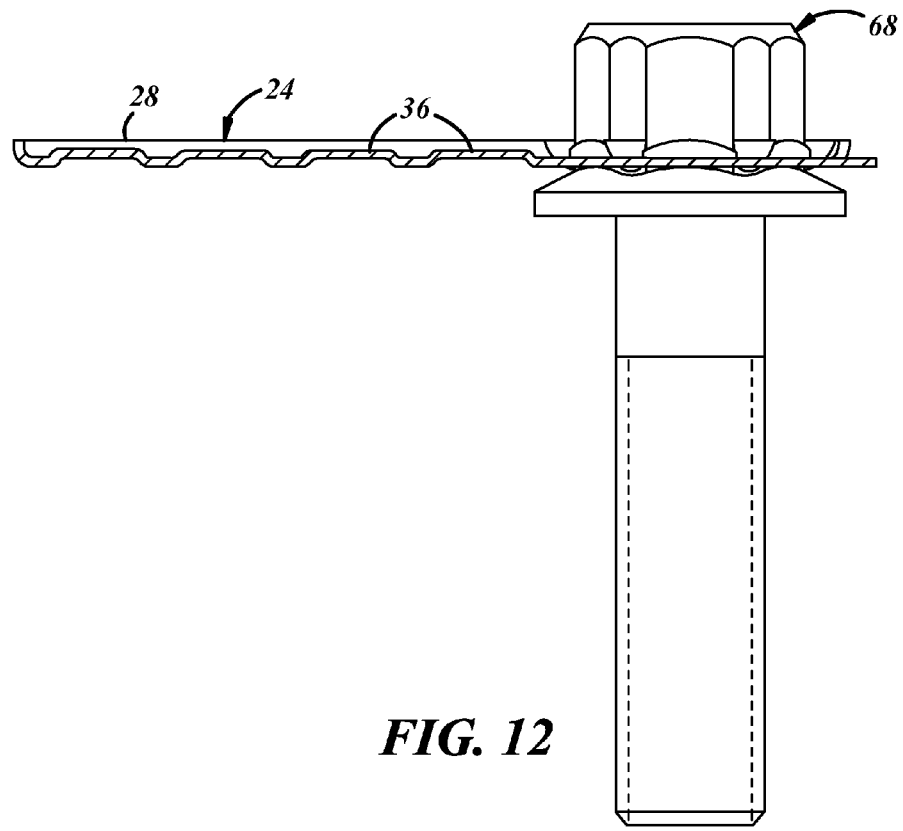
FIG. 12 is a sectional view taken substantially along the line 12-12 in FIG. 11.

FIGS. 11-12 illustrate a fastener and retainer assembly 66 that is essentially the same as assembly 20 in FIGS. 1-5 except that fastener 68 is a hex-head flange bolt rather than a hex-head flange nut as in the previous embodiments.

There thus has been described a fastener and a retainer assembly that fully obtains all of the objects and aims previously set forth. The disclosure has been presented in conjunction with several exemplary embodiments, and additional modifications and variations have been discussed. Other modifications and variations readily will suggest themselves to persons of ordinary skill in the art in view of the foregoing description. For example, flange nuts are illustrated as fasteners 22, 42, 44 and 54 in FIGS. 1-10, and a flange bolt 68 is illustrated in FIGS. 11-12. Flange nuts and bolts are preferred to facilitate assembly. However, other types of fasteners can be employed. The disclosure is intended to embrace all such modifications and variations as fall within the spirit and broad scope of the appended claims.

The invention claimed is:

1. A retainer and fastener assembly that includes:
a threaded fastener having a head with corners wherein said fastener is a flange nut or a flange bolt, and
a retainer projecting laterally from said head to engage adjacent structure and retain said head against rotation during threading, wherein said retainer consists essentially of a one-piece metal stamping including:
raised embossments and a raised edge flange to strengthen said retainer, a planar body from which said embossments and said edge flange extend,
a plurality of raised flanges extending generally perpendicularly from said planar body when said retainer is assembled to said fastener and disposed around and at least partially establishing an opening for receiving said fastener head and for contacting corresponding sides of said fastener head so that said fastener head and said retainer are non-rotatable with respect to one another, and
wherein said fastener head is non-removably secured to said retainer with one or more of said corners of said head staked against said retainer and wherein said retainer further includes rounded reliefs at least partially establishing said opening to accommodate said staked corners of said threaded fastener.

2. The assembly set forth in claim 1 wherein said opening and said fastener head are hexagonal.

3. The assembly set forth in claim 1 wherein said one-piece metal stamping includes linear side edges from which said edge flange extends, said side edges extending toward each other away from said hexagonal opening.

4. The assembly set forth in claim 1 wherein said retainer is flat as viewed laterally of said fastener.

5. The assembly set forth in claim 1 wherein said retainer is L-shaped as viewed laterally of said fastener.

6. The assembly set forth in claim 1, wherein the raised embossments are of different sizes and shapes.

7. The assembly set forth in claim 1, wherein the raised embossments include multiple independent and spaced apart raised embossments of different sizes and shapes.

8. The assembly set forth in claim 7, wherein the raised embossments are arranged in a pattern that is non-symmetrical.

9. The assembly set forth in claim 7, wherein the raised embossments include at least one triangular shaped embossment and at least one parallelogram shaped embossment.

10. The assembly set forth in claim 1, wherein said retainer also includes six of said raised flanges and six circumferential spaces between circumferential edges of said raised flanges, and a corresponding six of said corners of said threaded fastener are staked against said retainer between said six raised flanges.

11. The assembly set forth in claim 1, wherein said raised edge flange extends along at least a portion of the length of said retainer, and toward and longitudinally past at least a portion of said fastener head.

12. A retainer for a fastener and retainer assembly, which retainer consists essentially of a one-piece metal stamping having a hexagonal opening for receipt over a fastener head of a flange nut or a flange bolt, and raised embossments and a raised edge flange for strengthening the retainer against bending, wherein said retainer has a planar body from which said embossments and said edge flange extends, and said retainer also includes six flanges disposed around and at least partially establishing said hexagonal opening and extending generally perpendicularly from the generally planar body for contacting corresponding sides of the fastener head and wherein said retainer further includes rounded reliefs at least partially establishing said hexagonal opening to accommodate staked corners of a threaded fastener.

13. The retainer set forth in claim 12 wherein said stamping has linear side edges that extend toward each other away from said hexagonal opening.

14. The retainer set forth in claim 12 wherein said retainer is flat as viewed laterally of said hexagonal opening.

15. The retainer set forth in claim 12 wherein said retainer is L-shaped as viewed laterally of said hexagonal opening.

16. The retainer set forth in claim 12, wherein said retainer also includes six circumferential spaces between circumferential edges of said six flanges.

17. The retainer set forth in claim 12, wherein said raised edge flange extends along at least a portion of the length of said retainer, and toward and longitudinally past at least a portion of said hexagonal opening.

18. A retainer and fastener assembly that includes:
the retainer set forth in claim 12, and
a threaded fastener having a head with corners staked against said retainer between said six raised flanges.

* * * * *